(12) United States Patent
Tsuchiya

(10) Patent No.: US 12,235,728 B2
(45) Date of Patent: Feb. 25, 2025

(54) AUTOMATIC IDENTIFICATION AND ATTACHMENT OF REPLICATED VOLUMES TO APPLICATION

(71) Applicant: HITACHI, Ltd., Tokyo (JP)

(72) Inventor: Akiyoshi Tsuchiya, San Jose, CA (US)

(73) Assignee: HITACHI, Ltd., Tokyo (JP)

( * ) Notice: Subject to any disclaimer, the term of this patent is extended or adjusted under 35 U.S.C. 154(b) by 33 days.

(21) Appl. No.: 18/201,673

(22) Filed: May 24, 2023

(65) Prior Publication Data
US 2024/0394147 A1   Nov. 28, 2024

(51) Int. Cl.
G06F 11/14     (2006.01)
(52) U.S. Cl.
CPC .................... G06F 11/1448 (2013.01)
(58) Field of Classification Search
CPC ................................................ G06F 11/1448
See application file for complete search history.

(56) References Cited

U.S. PATENT DOCUMENTS 10,592,268 B2    3/2020  Nasu et al.
11,281,492 B1 *  3/2022  Rebeja .................. G06F 9/5077
2021/0314400 A1* 10/2021  Longinov ............... G06F 12/16

* cited by examiner

Primary Examiner — Edward J Dudek, Jr.
(74) Attorney, Agent, or Firm — Procopio, Cory, Hargreaves & Savitch LLP

(57) ABSTRACT

Systems and methods described herein can involve managing volume management information indicative of a relationship between an application and a volume used by the application; for receipt of a first request to make the application ready for takeover to another location, updating the volume management information to indicate that another volume of the another location is associated with the application. For receipt of a second request to conduct volume attachment for the application, the systems and methods can involve identifying one or more volumes associated with the application based on the volume management information; and attaching an identified volume from the identified one or more volumes to the application.

14 Claims, 18 Drawing Sheets

| App name | UID | Repository | Placement |
|---|---|---|---|
| App1 | be2b61c5-e882-4348-b18d-9579ac8c76a3 | https://abc.com/app1 | Cluster1 |
| App2 | f244aec9-453d-4da3-b04b-a5d79e232fa8 | https://abc.com/app2 | Cluster2 |

FIG. 2

| ID | Site | Endpoint |
|---|---|---|
| Cluster1 | Site1 | https://clustere1.abc.com |
| Cluster2 | Site1 | https://clustere2.abc.com |
| Cluster3 | Site2 | https://clustere3.abc.com |
| Cluster4 | Site2 | https://clustere4.abc.com |

FIG. 3

| App name | Image URL | Volume claim | Status | Placement |
|---|---|---|---|---|
| App1 | https://abc.com/app1 | claim1, claim2 | Running | Server1 |
| App2 | https://abc.com/app2 | claim3 | Terminated | Server2 |

FIG. 4

| ID | Size | Storage ID |
|---|---|---|
| Claim1 | 10 TB | Storage1 |
| Claim2 | 10TB | Storage1 |

FIG. 5

| ID | Size | Claim | Storage ID | ID in storage |
|---|---|---|---|---|
| 1 | 10 TB | Claim1 | Storage1 | VolA |
| 2 | 10 TB | Claim2 | Storage1 | VolB |

FIG. 6

| ID | Site | Endpoint |
|---|---|---|
| Storage1 | Site1 | https://storage1.abc.com |
| Storager2 | Site2 | https://storage2.abc.com |

FIG. 7

| App name | App UUID | Volume Claim | Volume ID | Owner Storage |
|---|---|---|---|---|
| App1 | be2b61c5-e882-4348-b18d-9579ac8c78a3 | claim1 | VolA | Storage1 |
| | | | VolC | Storage2 |
| | | claim2 | VolB | Storage1 |
| | | | VolD | Storage2 |
| App2 | f244aec9-453d-4da3-b04b-a5d79e232fa8 | claim3 | VolE | Storage2 |

FIG. 8

AUTOMATIC IDENTIFICATION AND ATTACHMENT OF REPLICATED VOLUMES TO APPLICATION

BACKGROUND

Field

The present disclosure is generally directed to volume replication, and more specifically, to identification and attachment of replicated volumes to application.

Related Art

Mobility of application and its data can be important to be facilitate benefits such as sustainability, availability and efficiency for Information Technology (IT) operations. For sustainability, synchronizing data among data centers with renewable energy generation facilities and migrating applications to sites with abundant renewable energy can contribute to data center decarbonization. Further, the availability of applications can be improved by migrating application into standby site with replicated data in the event of a disaster. Finally, for the application development efficiency, application test time can be shorted by replicating production data of the current version application to the test environment, and running the test for the newer version with the replicated data.

To achieve such benefits, the operation tends to be complicated because of the need for data copy, yet operational agility cannot be degraded. This is because the operation of the application that is core to the business must also be agile in order to increase business agility.

From another perspective, high resource utilization from the destination site is required to prevent IT resource cost increases. If the computing resource is reserved in advance for the destination of an application at the destination site, the resources become resources that are not normally used. In addition, if the destination server or cluster is statically determined, there is no flexibility to determine which servers or clusters have excess resources to migrate.

In consideration of these factors, there is a need for technology that allows applications and data to be mobile between sites without degrading operational agility and resource efficiency.

In the related art, Kubernetes is used for managing volume on an application platform. Kubernetes is orchestration software to run applications implemented with container technology. Kubernetes manages the relationship between volumes and applications in a database in a cluster. Here, a cluster is a group of servers or virtual machines (VM) managed by a single Kubernetes instance. The relation information is defined when an application is deployed onto the cluster. Based on this relationship information, the volume can be correctly attached to the application when the application is restarted.

In another example related art implementation, there is a method for a virtual machine having a replicated volume. Such methods can involve managing the relationship between storage systems and between storage system and server, selecting a storage system for placement of destination volume based on the first relationship information, selecting a server that can access the storage system having the destination volume for placement of destination VM based on the second relationship information, and placing VMs onto the selected servers.

SUMMARY

Related art implementations run into several problems. One problem is that the information on the relationship between volumes and applications is managed within the source cluster, and there is no guarantee that the information will be available from other clusters. For example, when an application is migrated to the destination cluster in another site for recovery, there may be cases in which the source site is unavailable due to a disaster or other reasons. In this case, it is not possible to use the information managed within the source site. Another problem is that the identifier of the destination volume can be different from that of the source. Since the source and destination volumes are different volumes, they have different identifiers. However, in the related art, the cluster manages the relationship between the source volume and the application and cannot identify the destination volume based on this information.

The related art also has problems with resource utilization efficiency. In the related art, there is no flexibility in deciding where to migrate the VM based on resource usage at the timing of a takeover because the server where the standby VMs will be placed is determined in advance. Such a related art implementation may result in low resource utilization.

The present disclosure involves systems and methods to automatically identify the copy destination volume and attach it to the application by maintaining the information on the relationship between the application and the source/destination volume in a location that is accessible from all clusters in the destination site.

Aspects of the present disclosure involve a method, which can include managing volume management information indicative of a relationship between an application and a volume used by the application; for receipt of a first request to make the application ready for takeover to another location, updating the volume management information to indicate that another volume of the another location is associated with the application; for receipt of a second request to conduct volume attachment for the application, identifying one or more volumes associated with the application based on the volume management information; and attaching an identified volume from the identified one or more volumes to the application.

Aspects of the present disclosure involve a system, which can include means for managing volume management information indicative of a relationship between an application and a volume used by the application; for receipt of a first request to make the application ready for takeover to another location, means for updating the volume management information to indicate that another volume of the another location is associated with the application; for receipt of a second request to conduct volume attachment for the application, means for identifying one or more volumes associated with the application based on the volume management information; and means for attaching an identified volume from the identified one or more volumes to the application.

Aspects of the present disclosure involve a computer program, which can include instructions including managing volume management information indicative of a relationship between an application and a volume used by the application; for receipt of a first request to make the application ready for takeover to another location, updating the volume management information to indicate that another volume of the another location is associated with the application; for receipt of a second request to conduct volume attachment for the application, identifying one or more volumes associated with the application based on the volume management information; and attaching an identified volume from the identified one or more volumes to the application. The computer program and instructions can be stored on a non-transitory computer readable medium and executed by one or more processors.

Aspects of the present disclosure involve an apparatus, which can include a processor, configured to manage volume management information indicative of a relationship between an application and a volume used by the application; for receipt of a first request to make the application ready for takeover to another location, update the volume management information to indicate that another volume of the another location is associated with the application; for receipt of a second request to conduct volume attachment for the application, identify one or more volumes associated with the application based on the volume management information; and attach an identified volume from the identified one or more volumes to the application.

BRIEF DESCRIPTION OF DRAWINGS

FIG. 2 illustrates the example of the application management table managed by the application manager, in accordance with an example implementation.

FIG. 3 illustrates the example of the cluster management table managed by the application manager, in accordance with an example implementation.

FIG. 4 illustrates the example of the application management table managed by the container orchestrator, in accordance with an example implementation.

FIG. 5 illustrates the example of the volume claim management table managed by the container orchestrator, in accordance with an example implementation.

FIG. 6 illustrates the example of the volume management table managed by the container orchestrator, in accordance with an example implementation.

FIG. 7 illustrates the example of the storage management table managed by the container orchestrator and the storage driver, in accordance with an example implementation.

FIG. 8 illustrates the example of the volume mapping table, in accordance with an example implementation.

DETAILED DESCRIPTION OF THE INVENTION

Figure 1A:
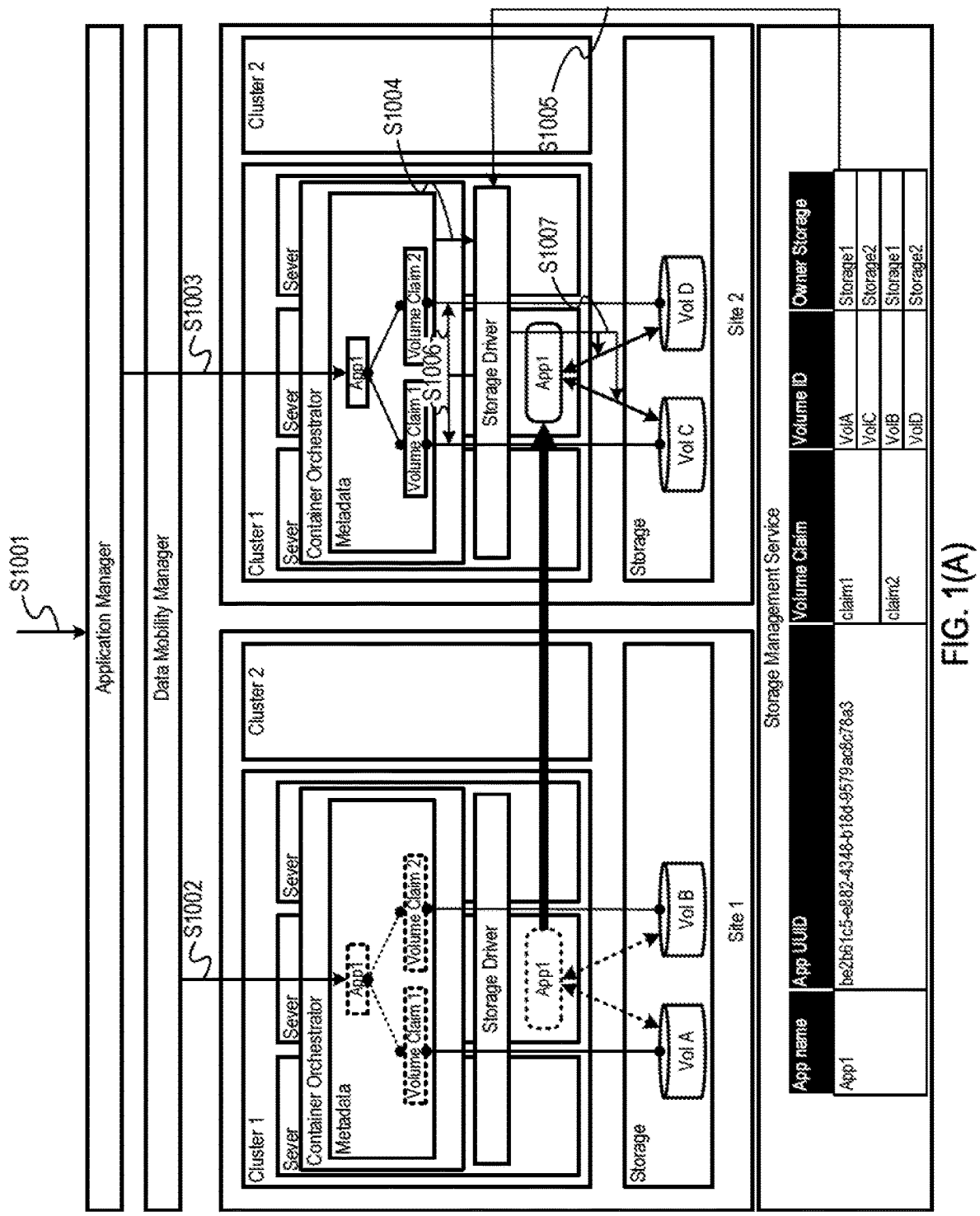
FIG. 1(A) illustrates the overview of overall system configuration and processing flow in a first example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1(A) illustrates the overview of overall system configuration and processing flow in a first example implementation. In the example of FIG. 1(A), there can be multiple sites, and each site can involve multiple clusters and one or more storage systems. The cluster is a group of server or virtual machines which are managed by one container orchestrator. Hereafter, servers and VMs are collectively referred to as servers. The examples of container orchestrator are Kubernetes, Mesosphere, and so on depending on the desired implementation. Further, storage and storage system may be used interchangeably.

The container orchestrator runs applications on the servers managed by the container orchestrator. Each container orchestrator has an internal database to manage information on applications and volumes used by the applications. In addition, the storage driver runs on the same server as the container orchestrator and helps the container orchestrator to prepare the volumes needed by the application.

The application manager is used to manage multiple clusters and applications executed on the clusters. In addition, the data mobility manager runs beside the application life cycle management to help volume mobility among clusters for application mobility.

There may be storage systems in the sites to store application data. Such storage can be dedicated hardware such as a Redundant Array of Inexpensive Disks (RAID) array or a Software-Defined Storage (SDS) running on a general-purpose server. It may also be provided as a Hyperconverged Infrastructure (HCI) where the SDS and container orchestrators and applications run on the same set of servers. Volumes are created in storage systems for applications, and the applications store its data into the volumes as well as read the data from the volumes.

To manage storage systems in all sites, the related art implementations use a storage management service. This service is typically offered to a Software as a Service (SaaS) that is connected to all site via a network, but this is only one form. In other forms, it can be provided as software and operated on a server prepared by the user depending on the desired implementation.

The storage management service manages the volume mapping table which manages information on the relationship between applications and volumes. This volume mapping table manages the relation between applications and not only the original volumes (source volumes) which are used in the takeover source cluster, but also the volume replicated from the takeover source cluster to the takeover destination.

When a user requests (S1001) to the application manager to change the execution location of an application (e.g., via a takeover operation), the application manager requests the cluster where the application is currently running (e.g., source cluster) (S1002), and requests the cluster where the application is to be executed (e.g., destination cluster) to run the application (S1003).

In response to S1003, the container orchestrator on the destination cluster requests a volume for the application to the storage driver on the cluster (S1004). According to the request, the storage driver refers to the volume mapping table and find the volumes which is associated to the application (S1005). The volume mapping table manages information on the relationship between applications and volumes. When a volume is created to deploy an application for the first time or copied to make the application takeover ready, the storage driver records the created volume or the copy destination volume as the volume used by the application into the volume mapping table. The storage driver associates the found volume with the application in the internal metadata database of the container orchestrator (S1006), and attach the volumes to the applications (S1007).

Figure 1C:
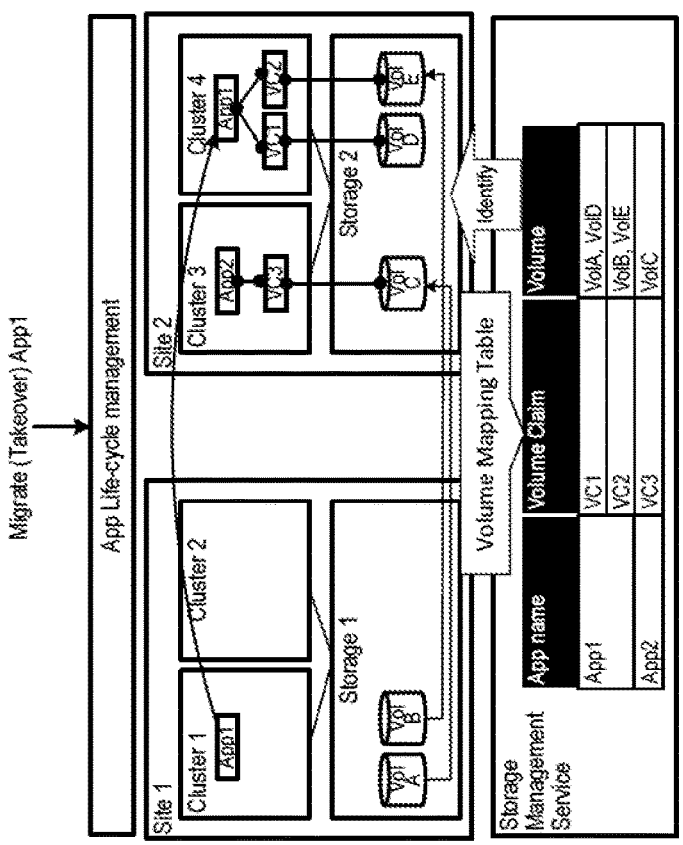
FIG. 1(B) and 1(C) illustrate an example of provisioning and application migration/takeover, in accordance with a first example implementation.
Figure 1B:
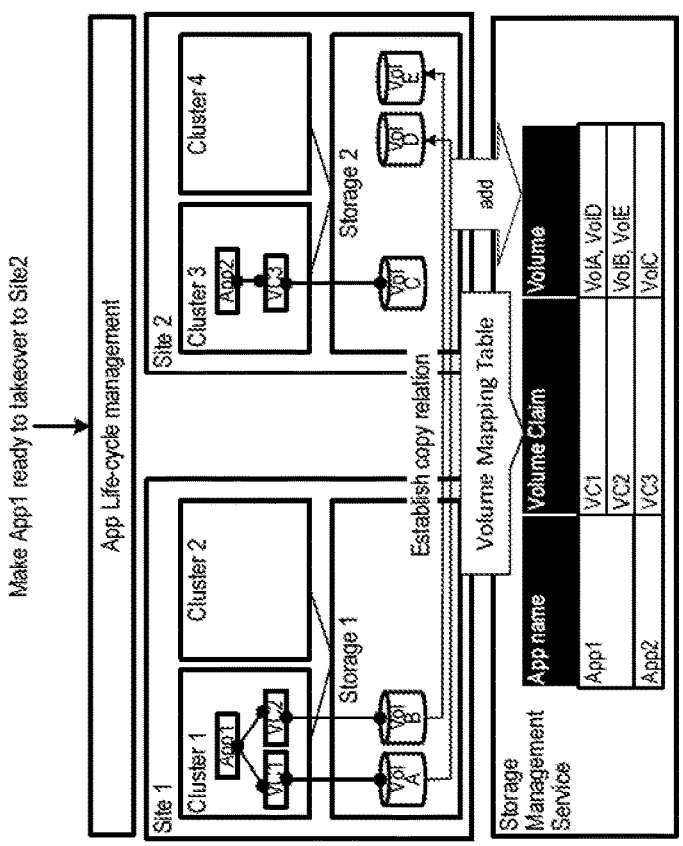

FIGS. 1(B) and 1(C) illustrate an example of provisioning and application migration/takeover, in accordance with a first example implementation. In the first example implementation, the relationship between the application and the copy source/destination volumes is recorded into a location that is accessible from all clusters in the destination site. An example as illustrated in FIGS. 1(B) and 1(C) is a storage management service. In the first example implementation, the volume storing the application data is identified based on the relationship managed in the location, and is attached accordingly.

In the example of provisioning as illustrated in FIG. 1(B), when volume copy is established, the volume mapping table is updated so that the destination volume has the same application relationship as the source volume. In this example, VolD and VolE are provisioned in Site 2 to make the application ready for takeover, which is reflected in the volume mapping table.

In the example of the execution of the application migration/takeover as illustrated in FIG. 1(C), the volumes associated with the application are identified based on the volume mapping table when takeover for the application is initiated. The volumes that can be accessed from the cluster where the application is to be launched are selected from identified ones as illustrated in FIG. 1(C) (in this case, VolD and VolE). Further details of the first example implementation are described below.

FIG. 2 illustrates the example of the application management table managed by the application manager, in accordance with an example implementation. Each entry of the application management table can include the application (app) name, Universal Identifier (UID), repository, and current placement. Each application has a corresponding entry in the application management table.

App name is a name of the application. UID is a global unique identifier of the application. Both app name and UID are information that identifies an application. The difference is that the UID is guaranteed to be unique, while the app name is not. However, the app name is an expression that is easy for users to identify. Typically, the app name is specified by users and the UID is determined by the application manager automatically when the application is deployed. One of them can be omitted, depending on the desired implementation.

Repository is information on the location of the repository that has manifest files to deploy the application. The typical form of the information is the Uniform Resource Locator (URL) of the repository.

Placement is information on the location where the application runs. Typically, the location is specified with the identifier ID of the cluster on which the application runs.

FIG. 3 illustrates the example of the cluster management table managed by the application manager, in accordance with an example implementation. One entry of the cluster management table has ID, site and endpoint.

ID is an identifier of the cluster. Examples of ID formats are arbitrary strings, numbers, and UIDs. Site is an identifier of the location where the cluster exists. Typical examples are identifiers of availability zone or region, or both. Typically, there are multiple availability zones in a region. If the uniqueness of identifiers of availability zones is not guaranteed across regions, the combination of region and availability identifiers can be used as site information. In addition to this, any string or numerical value specified by the user to identify the location may be used.

Endpoint is the URL to which the request such as application deployment and deletion is sent. The application manager uses this information to send the request.

FIG. 4 illustrates the example of the application management table managed by the container orchestrator, in accordance with an example implementation. The container orchestrator has, in the application management table, entries of the applications that run on its own cluster. In an example, one entry of the in-cluster application management table has ID, image URL, volume claim, status, and placement. Each application has a corresponding entry in the in-cluster application management table.

ID is an identifier of the application. Image URL is information on the location of the container image registry where the container image of the application is stored. The typical form of the information is the URL of the repository. Volume claim is information on volumes used by the application. This field refers to entries of the volume claim management table with the ID of the volume claim. If the application uses multiple volumes, then this field will have multiple values. If the application uses no volumes, then this field will have no values.

Status is information on the application status. "Running" means that the application has been started up and running. "Terminated" means that the application has been stopped. Instead of having the "Terminated" status in this field, deleting the corresponding entry from the in-cluster application management table is another implementation example to describe that the application has stopped. In addition to these statuses, other statuses may be had. For example, the "Waiting" status means waiting for the startup of the application to complete.

Placement is information on the server where the application runs. Typically, the location is specified with the ID of the server on which the application runs, ID, image URL, and volume claims are specified by users in the manifest files which is to deploy the application. Status is decided by the container orchestrator according to the container's status. Placement is also decided by the container orchestrator when the application is deployed onto the cluster.

FIG. 5 illustrates the example of the volume claim management table managed by the container orchestrator, in accordance with an example implementation. Each entry has ID, size, and storage ID. By creating the new entry to the volume claim management table, volume creation is requested. Therefore, each entry of the volume claim management table has a corresponding entry in the volume management table. The container orchestrators can have only entry of volume claims created in their own cluster.

ID is an identifier of the volume claim. Size is the requested size of a volume that the application requires. Storage ID is the location where the volume should be created. Specifying storage by storage ID is an example of an implementation.

Another example is the specification by URL of an Application Programming Interface (API) endpoint to request volume operations on the storage. Volume claims are defined by users as a part of manifest files for the application.

FIG. 6 illustrates the example of the volume management table managed by the container orchestrator, in accordance with an example implementation. The container orchestrators can have only entry of volumes associated with volume claims created in their own cluster. Each entry has ID, size, claim, storage ID, and ID in storage. Each entry of the volume management table has a corresponding entry in the volume claim management table.

ID is an identifier of the volume. Claim is a reference to the corresponding entry in the volume claim management table. Size is the size of a volume. Storage ID is information of the storage that owns the volume. Specifying storage by storage ID is an example of an implementation. Another example is the specification by URL of an API endpoint to request volume operations on the storage.

ID in storage is the identifier of the volume managed by each storage. If the identifier is the same as the identifier in the container orchestrator, then this field can be omitted.

FIG. 7 illustrates the example of the storage management table managed by the container orchestrator and the storage driver, in accordance with an example implementation. In the example of FIG. 7, each entry of the storage management table has ID, site, and endpoint.

ID is an identifier of the storage. Examples of ID formats are arbitrary strings, numbers, and UIDs. Site is an identifier of the location where the storage exists. Typical examples are identifiers of availability zone, region, or both. Typically, there are multiple availability zones in a region. If the uniqueness of identifiers of availability zones is not guaranteed across regions, the combination of region and availability identifiers can be used as site information. In addition to this, any string or numerical value specified by the user to identify the location may be used.

Endpoint is an URL to which the volume or volume copy operation request is sent. The storage driver uses this information to request volume creation, deletion, attachment, volume copy establishment, and deletion to storage systems.

FIG. 8 illustrates the example of the volume mapping table, in accordance with an example implementation. In the first prior art, the volume mapping table is managed by the storage management service. The volume mapping table records the information on the relationship between application and volumes. One entry of the volume mapping table has app name, app UID, volume claim, volume ID Owner storage.

App name is a name of the application. App UID is a UID of the application. Volume Claim indicate volume claims that the corresponding application specifies to use volumes. If the application uses multiple volumes, then the corresponding entry of the volume mapping table has multiple entries for the volume claim field.

Volume ID is a volume ID in the owner storage. Each volume claim has its own corresponding volume ID, if a volume is replicated to make the application takeover ready, it has multiple volume IDs for each volume claim. Owner storage is the identifier of the storage which the volume owns.

The app name, app UID, and volume claim are examples of information used to identify from which application the volume is being used. It may have all three as shown in the example of FIG. 8, or any such fields in singular or in combination depending on the desired implementation.

Figure 9:
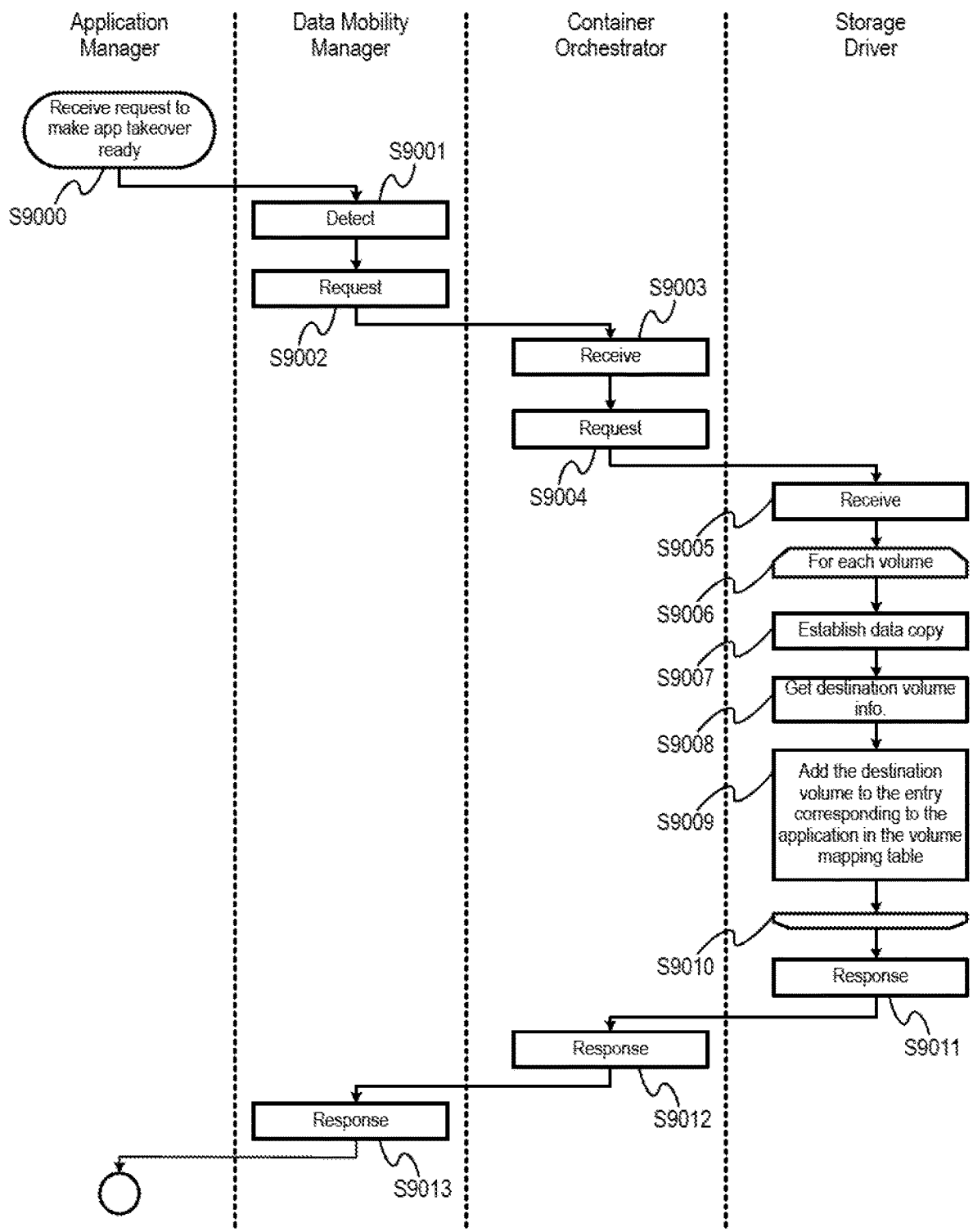
FIG. 9 illustrates an example processing flow to make an application takeover ready, in accordance with an example implementation.

FIG. 9 illustrates an example processing flow to make an application takeover ready, in accordance with an example implementation. This processing is triggered by the users' request to make an application takeover ready to the application manager. To request it, users specify the application with UID or app name of the application. When the application manager receives the user request to make an application takeover ready (S9000), the data mobility manager detects it (S9001).

Then, the data mobility manager requests the container orchestrator of the cluster where the application runs now to prepare volumes to make the application takeover ready (S9002).

The container orchestrator receives the request (S9003) and requests the storage driver to prepare volume to make the application takeover ready (S9004).

When the storage driver receives the request (S9005), the storage driver conducts processing from S9006 to S9010 for each volume used by the application. The storage driver identifies the volume used by the application with the in-cluster application management table, the volume claim management table and the volume management table. The storage driver searches the in-cluster application management table with the app name or UID of the specified application to identify the corresponding entry. Further, the storage driver identifies the volume claims used by the application by referring to the volume claim field of the identified entry of the in-cluster application management table. In addition, the storage driver searches the volume management table using each identified volume claims to identify the volume corresponding to each volume claim.

For each volume, the storage driver requests the owner storage to establish data copy relation (S9007) for the volume associated to the volume claim in processing and get the destination volume information (S9008). After that, the storage driver adds the new entry corresponding to the volume claim of the application in the volume mapping table. The new entry has the information of the destination volume (S9009). By the process at S9009, the copy destination volume is associated with the application. The information added here is used to identify the volume to be used at the takeover destination in the process shown in FIG. 10, which is executed when the application is taken over. At S9010, the loop from S9006 is reiterated until each volume is processed.

When processing is completed for all volume claims, the storage driver returns the result of the processing to the container orchestrator (S9011). The container orchestrator returns the result to the data mobility manager (S9012) and the data mobility manager returns it to the application manager (S9013).

Figure 10:
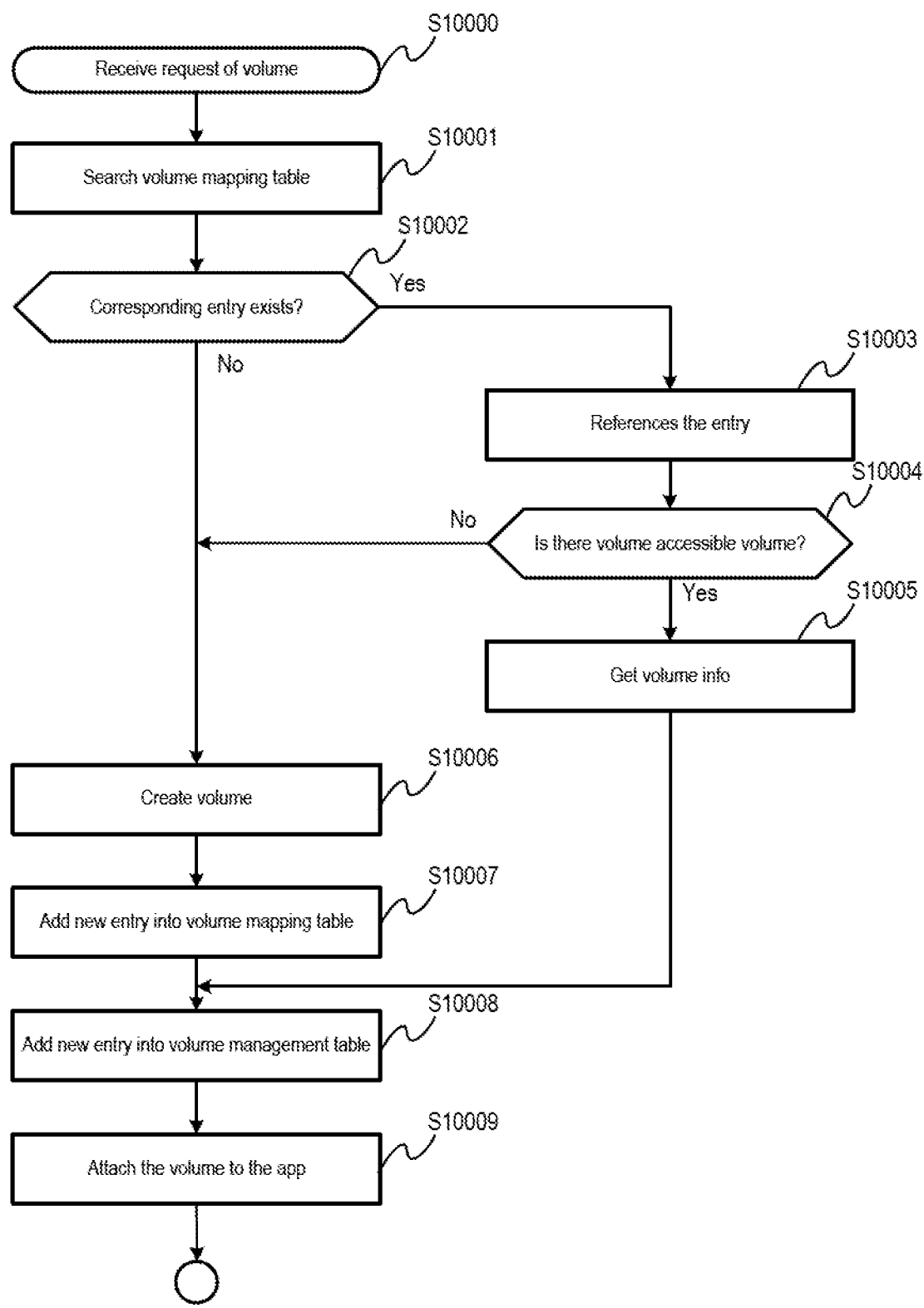
FIG. 10 illustrates an example of the processing flow to prepare the volume for the application, in accordance with an example implementation.

FIG. 10 illustrates an example of the processing flow to prepare the volume for the application, in accordance with an example implementation. Preparing the volume is the process of identifying whether the volumes to be used by the application exist at the site where the application is to be launched, creating new volumes if it does not, and attaching the identified or created volume accordingly. When the container orchestrator is requested to deploy the application, the container orchestrator requests a volume from the storage driver for each volume claim associated with the application. In response to the request, the storage driver executes this processing. This application deployment request is requested both when launching the application for takeover and when launching the application to the takeover source.

Specifically, FIG. 10 illustrates the details of the processing flow of S1005-S1007 in FIG. 1. At S10000, the request for the volume is received. The storage driver searches the volume mapping table at S10001 and finds the entry corresponding to the volume claim (S10002).

If the corresponding entry exists (S10002 is yes), the storage driver references the entry (S10003) and confirms if there is a volume associated with the volume claim in the location accessible from the cluster where the storage driver runs (S10004). As an example of the implementation of S10004, it can be determined by confirming whether any of the volumes in the relevant entry are owned by a storage facility located at the same site as the cluster. Whether or not the storage exists in the same site as the cluster can be determined by checking whether the site of the cluster in the cluster management table and the site of the storage in the storage management table is the same. If so (S10004 is yes), the storage driver gets the volume information from the entry (S10005)

If the corresponding entry does not exist (S10002 is no) or there is no volume associated with the volume claim in the location accessible from the cluster where the storage driver runs (S10004 is no), the storage driver creates a new volume by requesting the storage (S10006) and creates a new entry into the volume mapping table (S10007). The new entry has the relationship between the application and the created volume. The volume created here is the volume created at the time of initial deployment of the application, which is the source volume to be copied when required to make the application takeover ready.

The fields of the new entry are filled according to the application information, volume claim information and created volume information. The next and subsequent application launches will use this information to identify the volume that is created at this time.

Afterwards, the storage driver creates a new entry in the volume management table based on the information on the volume information obtained in S10005 or the volume created is S10006 (S10008) and attach the volume to the application (S10009).

At S9009 in FIG. 9, the copy destination volume in the takeover destination site is associated with the application. In addition, at S10007, the copy source volume in the takeover source site is associated with the application. Therefore, both volumes are associated with the application by both steps. As a result, the copy destination volume can be identified as the volume used by the application when takeover is performed, and the copy source volume can be identified as the volume used by the application when the application is restarted at the source site without takeover.

At the time of both takeover and restart, the process shown in FIG. 10 is executed to prepare the volume for the application.

Figure 11A:
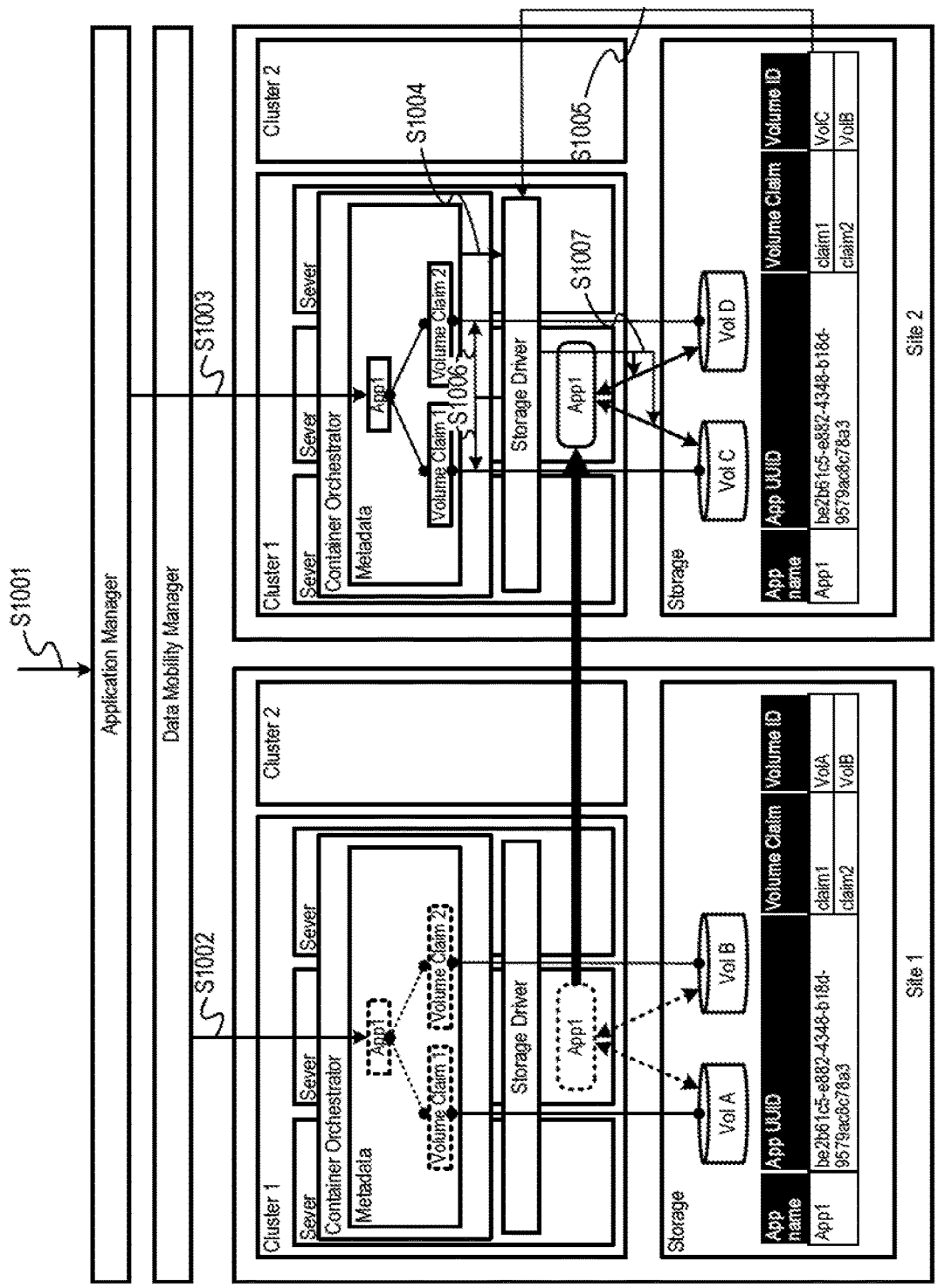
FIG. 11(A) illustrates an example architecture in accordance with a second example implementation.

FIG. 11(A) illustrates an example architecture in accordance with a second example implementation. In the second example implementation, the storage systems maintain the volume mapping table instead of the storage management service in the first example implementation.

The volume mapping table must be kept in a location that can be referenced by a group of clusters that could be the destination. The location can be a storage system at each site. This is because the storage system is connected and accessible from each cluster via a network and each cluster can access the storage systems.

By keeping the volume mapping table in a distributed manner, the second example implementation can distribute the load of updating and referencing the volume mapping table and thereby contribute to improving system scalability.

In the second example implementation, each storage system may retain information about only the volumes in its own storage system. For example, in the example shown in FIG. 11(A), for the volumes VolA, VolB, VolC, and VolD associated with App1, the storage in Site1 should retain only information on VolA and VolB, and the storage in site2 should retain only information on VolC and VolD.

Figure 11C:
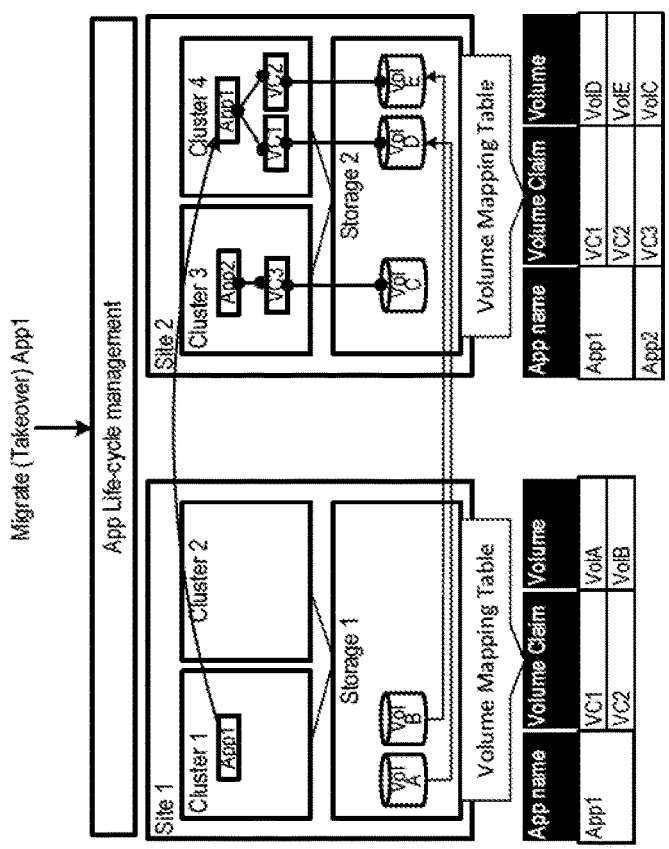
FIG. 11(B) and 11(C) illustrate an example of provisioning and application migration/takeover, in accordance with a second example implementation.
Figure 11B:
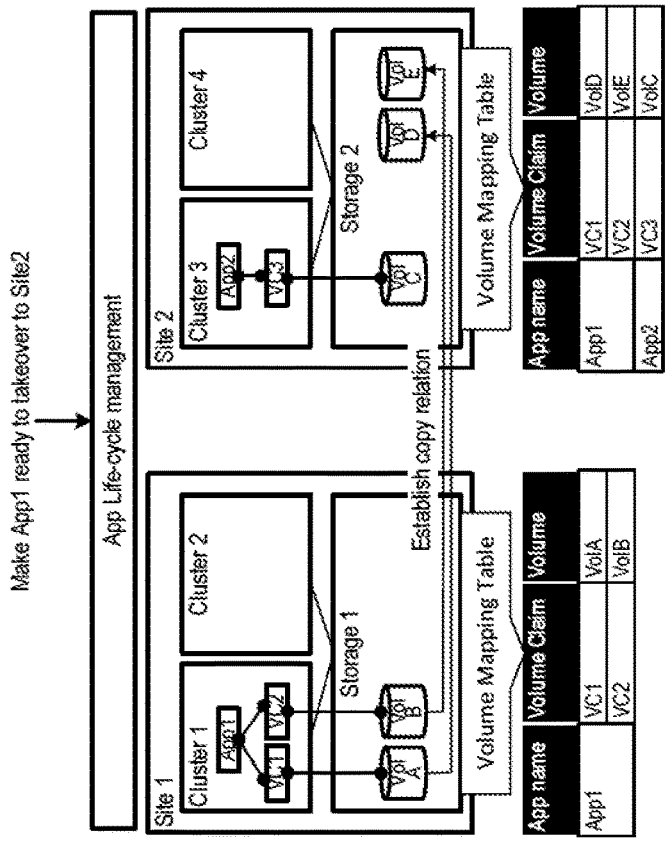

FIGS. 11(B) and 11(C) illustrate an example of provisioning and application migration/takeover, in accordance with a second example implementation. Instead of a centralized service to manage multiple storage system in multiple sites, the volume mapping table can be maintained in each storage system.

In the example of the provisioning as illustrated in FIG. 11(B), the volume mapping table is stored in each storage system, wherein each storage system can have their own version of the volume mapping table to manage the volumes contained within the storage system. In the example of FIG. 11(B), the application has not yet been deployed to the destination site, but the application information is filled in based on the information at the source site. Then, during the application migration/takeover as illustrated in FIG. 11(C), the volumes are identified and attached to the application based on the volume mapping table in the storage systems.

Figure 12A:
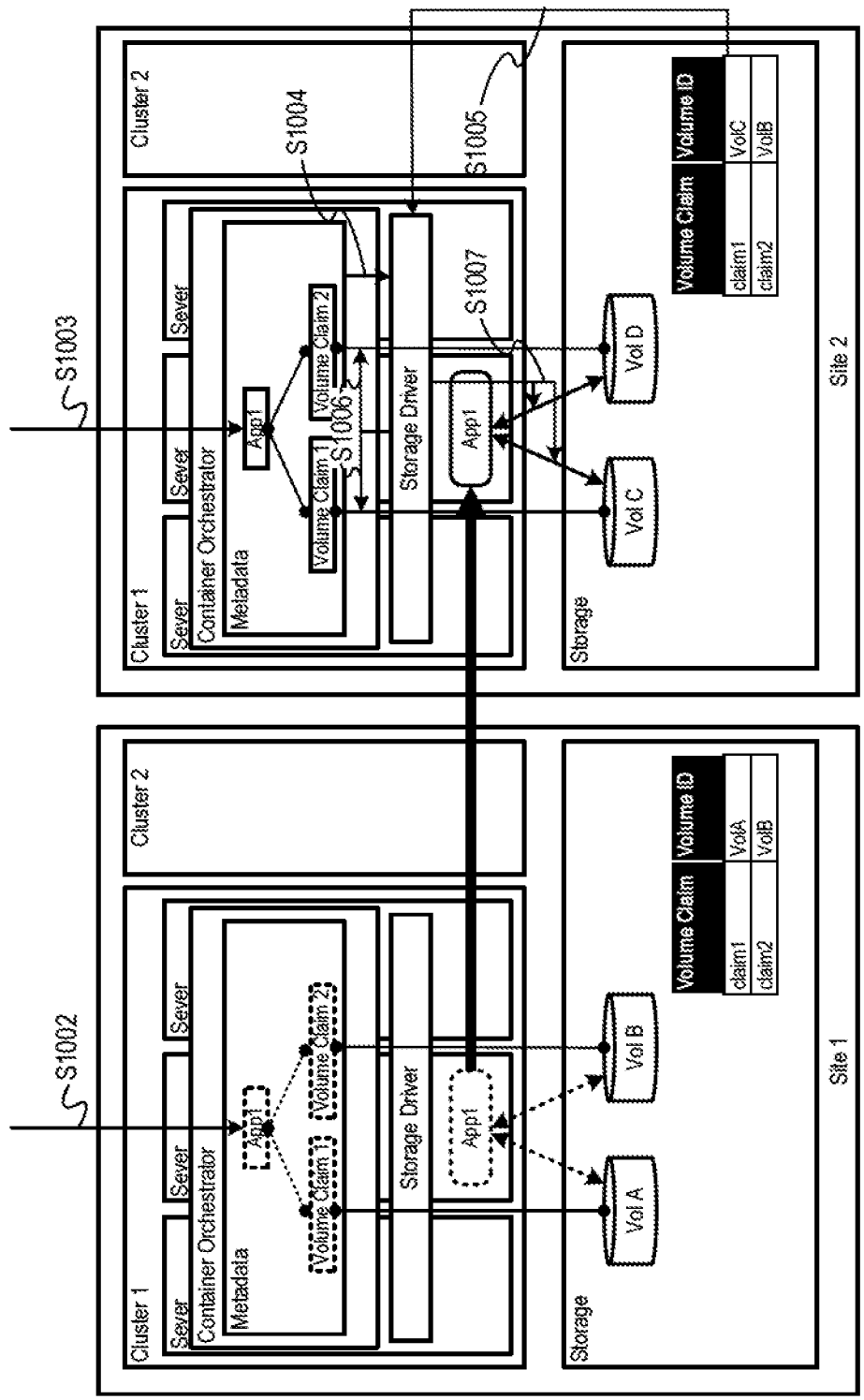
FIG. 12(A) illustrates an example architecture in accordance with a third example implementation.

FIG. 12(A) illustrates an example architecture in accordance with a third example implementation. In this form, only the relationship between the identifier of the volume claim and the volume identifier is recorded to identify which volumes are used by the application. When an application is taken over to a different cluster, a volume claim is also issued to the destination cluster with the same identifier as the volume claim issued in the source cluster. Therefore, the volume used by the application can be identified through only maintaining the relationship between the volume claim and the volume.

This example implementation can be applied even in a configuration where there is no application manager responsible for application identifier assignment and management across clusters. Such an example implementation also leads to cost reduction for data retention because the information to be retained in the volume mapping table is reduced.

Figure 12C:
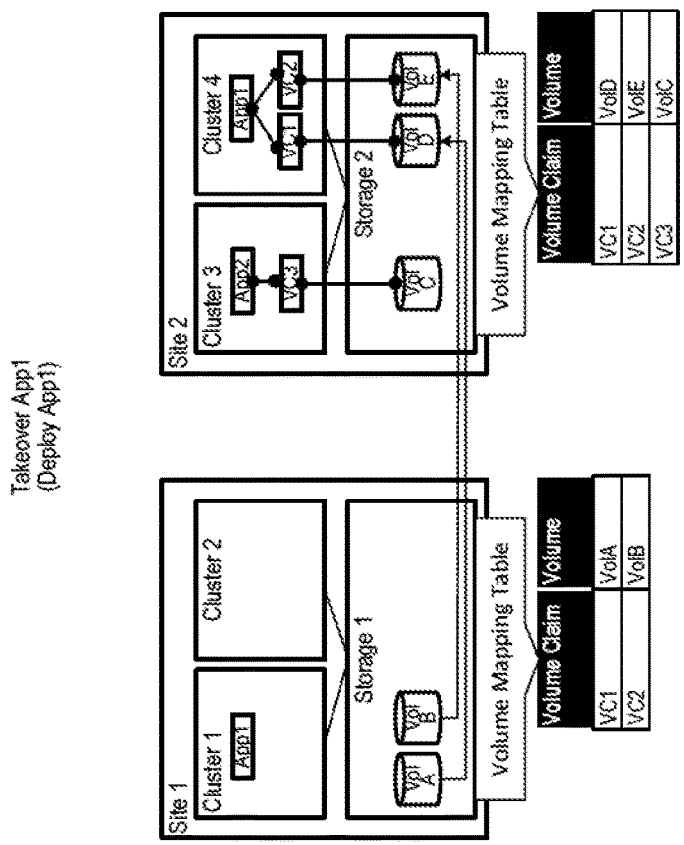
FIG. 12(B) and 12(C) illustrate an example of provisioning and application migration/takeover, in accordance with a second example implementation.
Figure 12B:
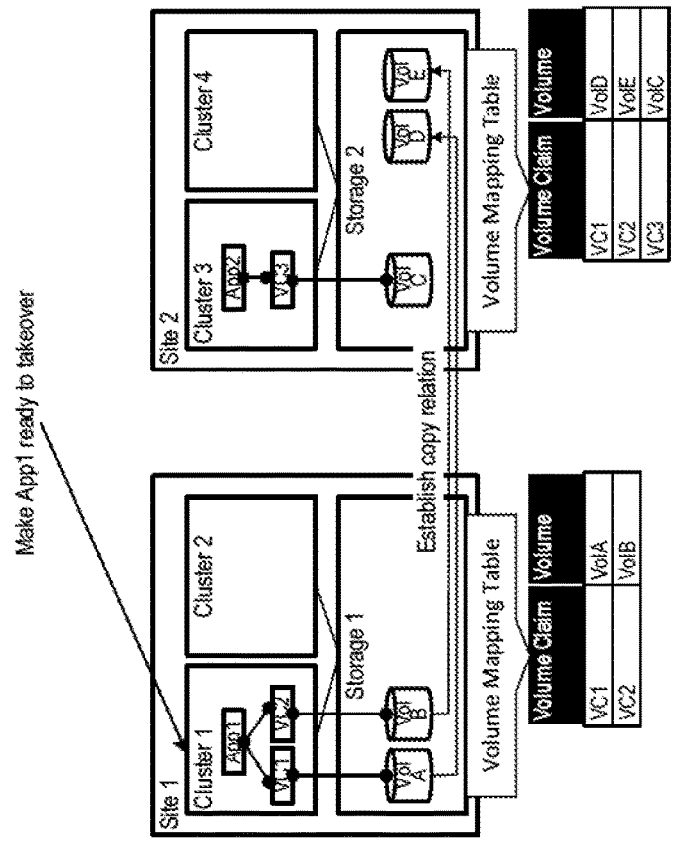

FIGS. 12(B) and 12(C) illustrate an example of provisioning and application migration/takeover, in accordance with a third example implementation. Instead of the application name, the volume claim can be used for search key in volume mapping table because typically, the applications issue volume claims having same name if re-deployed or migrated.

In the example of FIG. 12(B), assume that the application issues volume claims having the same name before and after takeover, Accordingly, the volume claim name can be used as a key for identifying volumes. In this example implementation, the volume mapping table maintains a relation between volume claim and volume. When the application is deployed on the destination site, volumes are identified by searching the volume mapping table with the volume claim name as illustrated in FIG. 12(C).

Figure 13A:
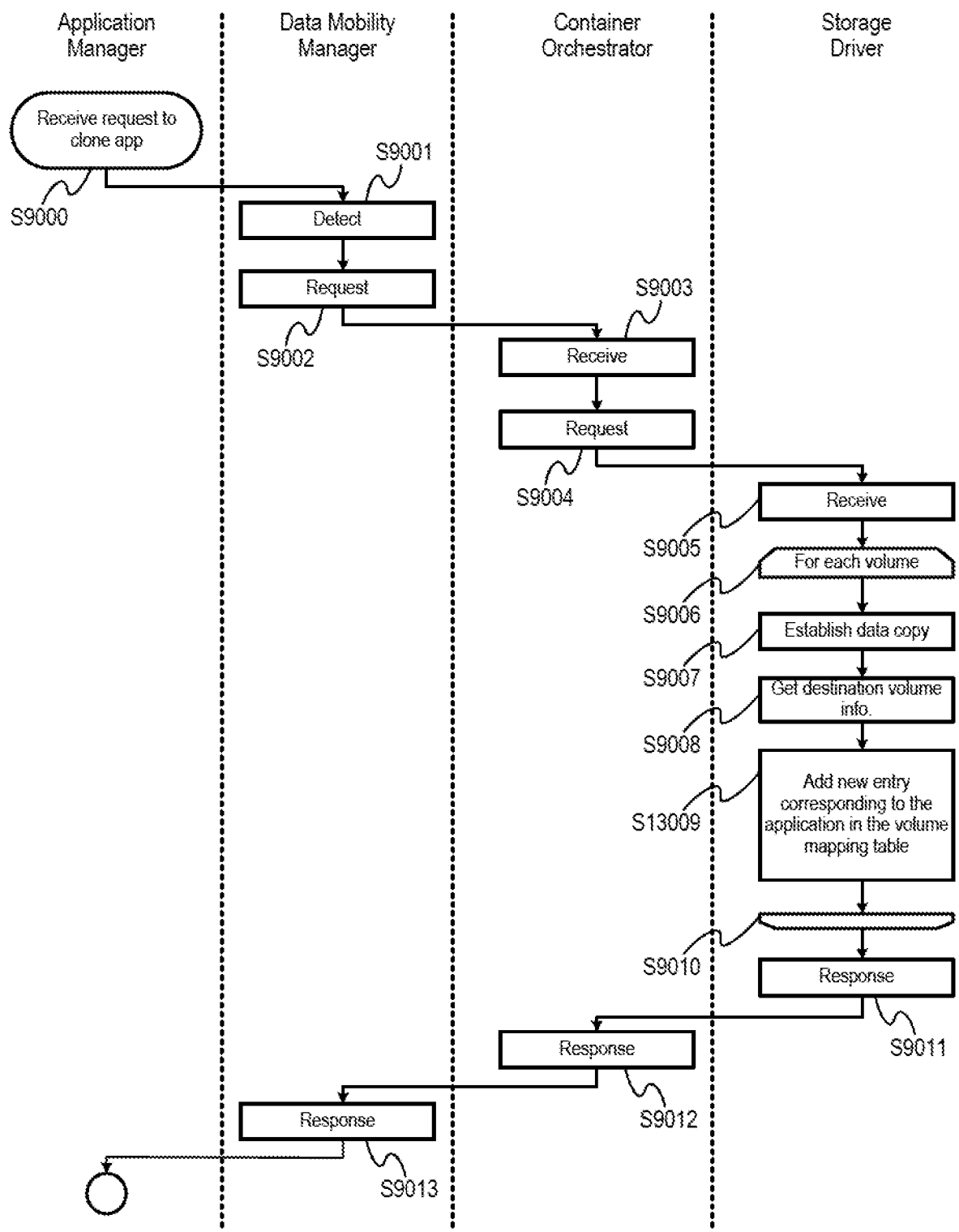
FIG. 13(A) illustrates the example of the processing flow to prepare volume for cloning application, in accordance with a fourth example implementation.

FIG. 13(A) illustrates the example of the processing flow to prepare volume for cloning application, in accordance with a fourth example implementation. The application cloning is used for building a test environment having the production data for the application. Another use case is duplicating database instances to reuse their data for other purpose such as data analytics.

As in the other examples, when the application manager receives the request, the data mobility manager detects and notifies the storage driver of the request via the container orchestrator, and establishes a copy for the volumes used by the application so that a copy of the volumes is available on the destination cluster. The difference compared with FIG. 9 is S13009.

In case of cloning the application, the storage driver adds a new entry to the volume mapping table with the copy destination volume as the volume associated with the clone destination application. This is because, in an application clone, the destination application is an application that is independent of the source application.

Figure 13B:
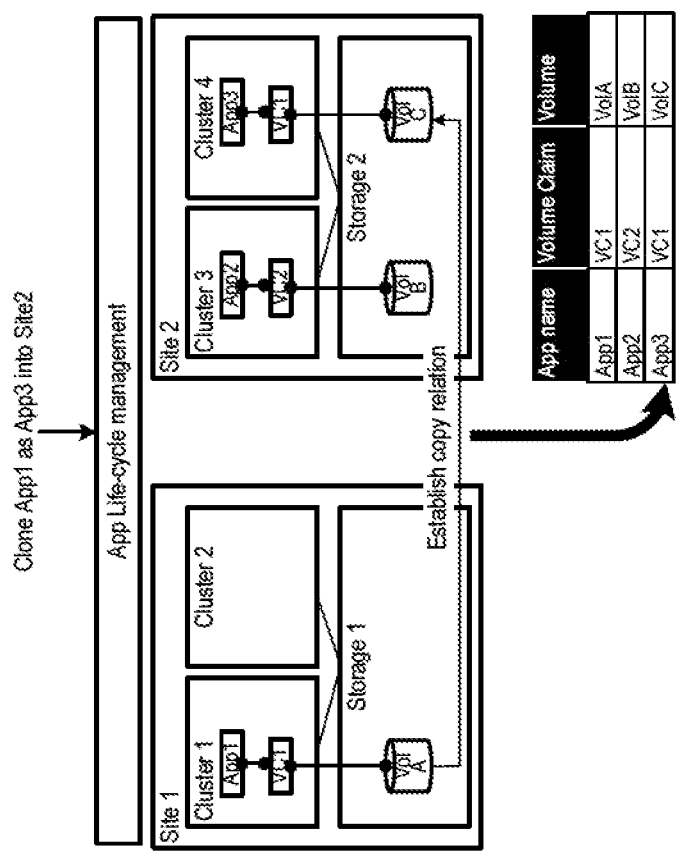
FIG. 13(B) illustrates an example of cloning application, in accordance with an example implementation.

FIG. 13(B) illustrates an example of cloning application, in accordance with an example implementation. Example purposes for cloning applications can include, but is not limited to, for building test environments having production data for the application, and duplicating database applications to use the data for the other purposes (analytics, etc.). In the example implementation of FIG. 13(B), for volume replication for the application cloning, the destination volume is associated with the cloned application with creating a new entry in the volume mapping table for the relationship, and not for the original application.

Figure 14A:
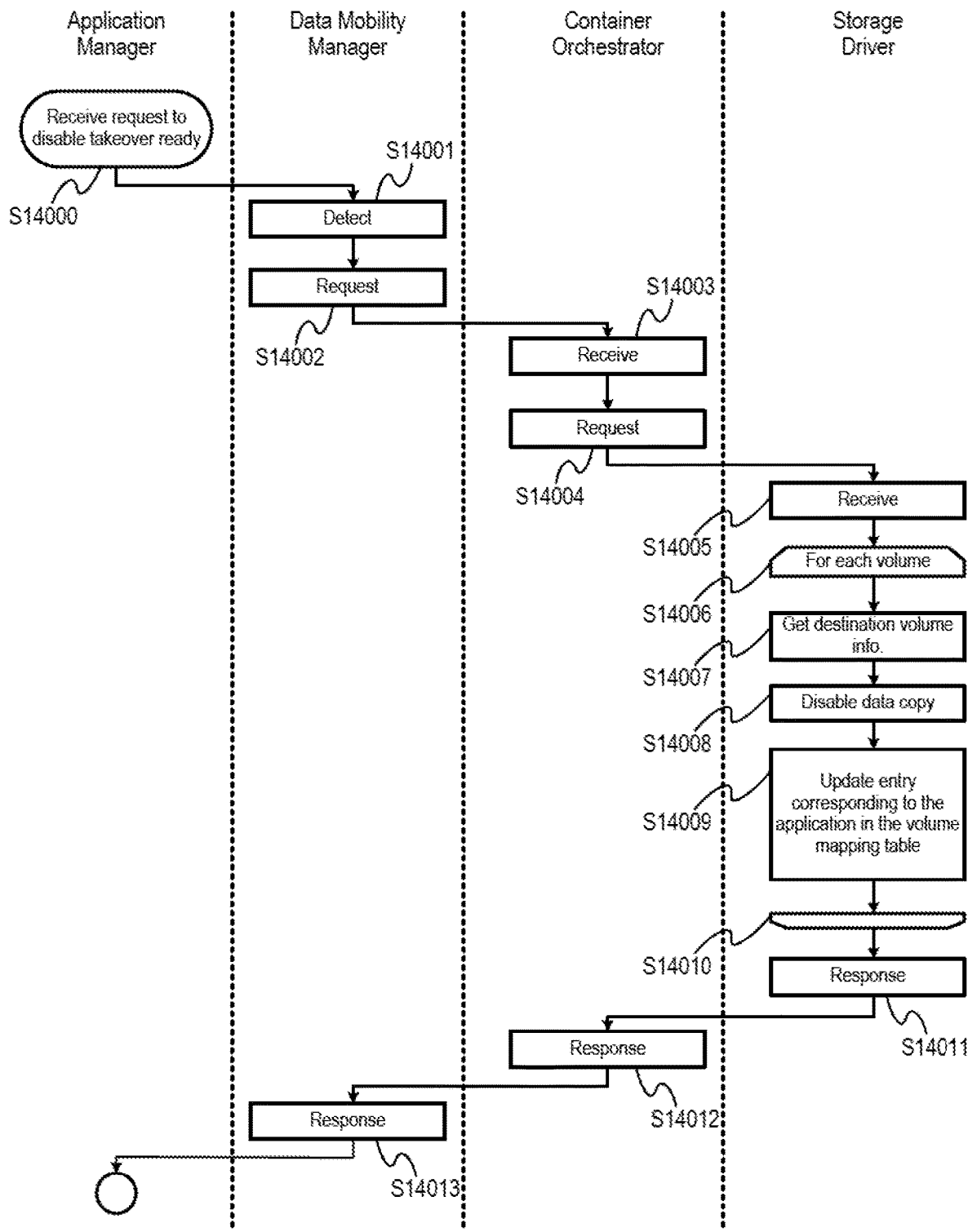
FIG. 14(A) show the example of the processing flow to disable takeover readiness in accordance with a fifth example implementation.

FIG. 14(A) show the example of the processing flow to disable takeover readiness in accordance with a fifth example implementation. When the application no longer requires takeover readiness, it is desired to be disabled to reduce storage costs.

When the application manager receives the user request to disable takeover readiness for the application (S14000), the data mobility manager detects the request (S14001). Then, the data mobility manager requests the container orchestrator of the cluster running the application to handle this request (S14002). The container orchestrator receives the request (S14003) and requests the storage driver to delete and disable data copy for the volumes used by the application (S14004).

When the storage driver receives the request (S14005), the storage driver conducts processing from S14006 to S14010 for each volume used by the application. The storage driver identifies the volume used by the application with the in-cluster application management table, the volume claim management table and the volume management table. The storage driver searches the in-cluster application management table with the app name or UID of the specified application to identify the corresponding entry. Further, the storage driver identifies the volume claims used by the application by referring to the volume claim field of the identified entry of the in-cluster application management table. The storage driver also searches the volume management table using each identified volume claims to identify the volume corresponding to each volume claim.

For each volume (S14006), the storage driver gets the information on the copy destination volume (S14007). The storage driver can identify the storage having the volume by referring to the owner storage field of the entry corresponding to the volume in the volume mapping table, and can identify the volume by referring the volume ID field of the entry.

Next, the storage driver disables the existing data copy relation for the volume (S14008). This is conducted by requesting the storage system having the volume to disable data copy. At this time, the copy destination volume may be deleted as it is no longer needed.

Next, the storage driver updates the volume mapping table to delete the association between the copy destination volume and the application (S14009). This can be implemented by deleting the copy destination volume information from the entry corresponding to the target application in the volume mapping table.

When processing is completed for all volumes used by the application (S14010), the storage driver returns the results to the container orchestrator (S14011), and the container orchestrator returns it to the data mobility manager (S14012). Finally, the data mobility manager returns the result to the application manager (S14013).

Figure 14B:
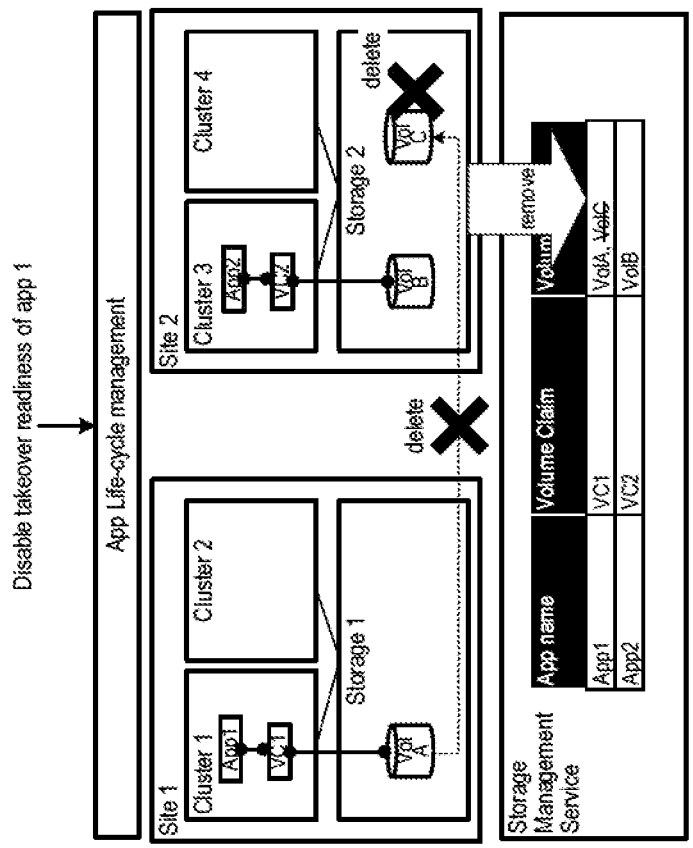
FIG. 14(B) illustrates an example of disabling takeover readiness, in accordance with the fifth example implementation.

FIG. 14(B) illustrates an example of disabling takeover readiness, in accordance with the fifth example implementation. Disabling takeover readiness can be conducted when there is no longer any need to have the application in takeover readiness state, so it can thereby be disabled to reduce storage costs. For the request to disable takeover readiness, the copy relation and copy destination volume are deleted and the volume information is removed from the entry of the corresponding application.

Figure 15:
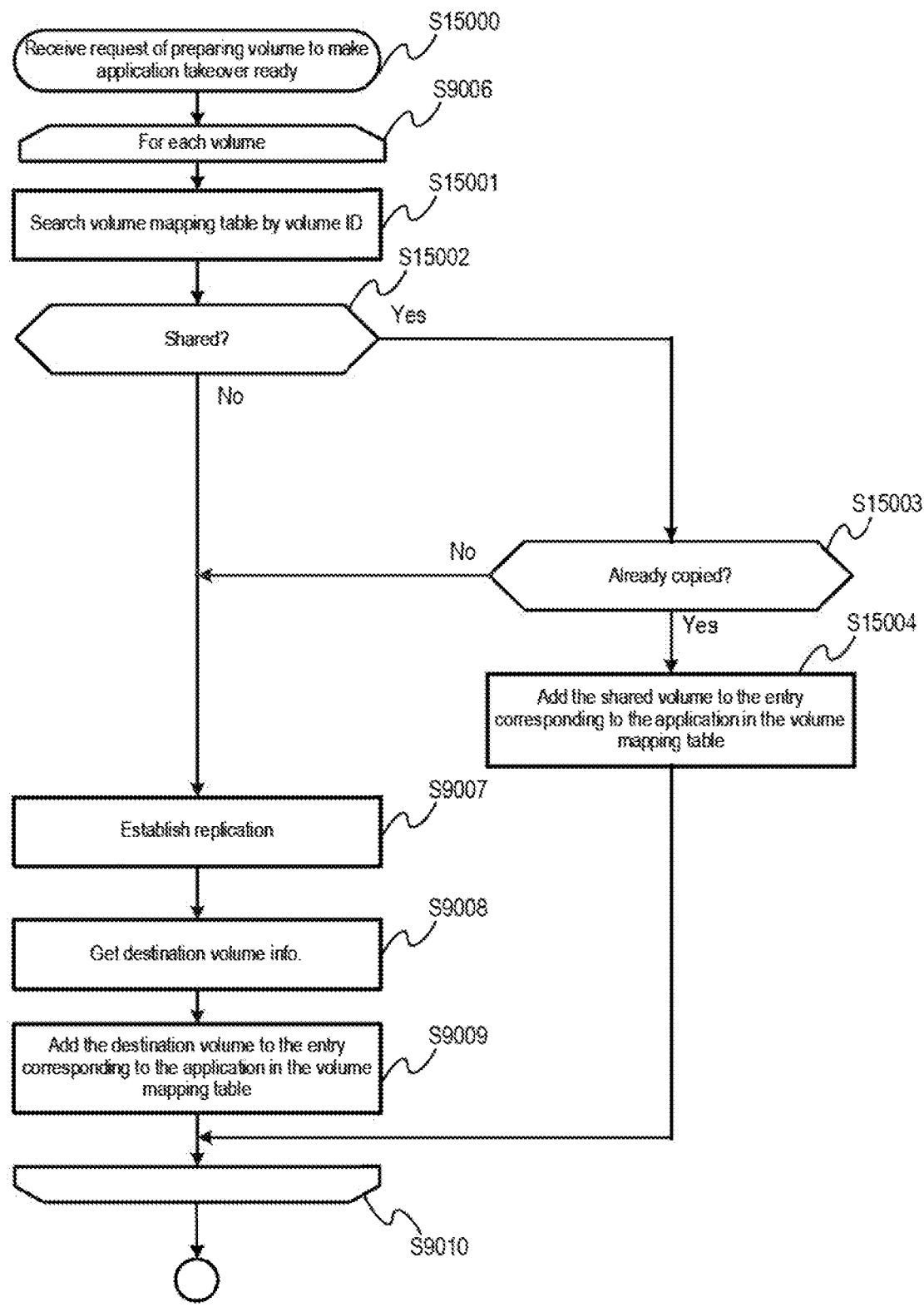
FIG. 15(A) illustrates the processing flow to make the application takeover ready in case multiple application shares volumes in accordance with a sixth example implementation.
FIG. 15(B) and 15(C) illustrates an example of when multiple applications share volumes, in accordance with the sixth example implementation.

FIG. 15(A) illustrates the processing flow to make the application takeover ready in case multiple applications share volumes in accordance with a sixth example implementation. Sometimes volumes are shared among multiple applications. For example, in a data analysis application, multiple applications may reference a common volume used as a data lake. In this case, when multiple applications sharing the same volume are configured to be takeover ready to the same destination, the volume should not be copied individually and should also be shared in the destination site to prevent increases in storage cost.

To implement the flow, the steps from S9006 to S9010 in FIG. 9 are replaced with steps from S15001 to S15004 in FIG. 15(A).

Hereafter, only the differences from the steps S9006 to S9010 in FIG. 10 are explained.

The storage driver executes S9006 to S9010 for each volume that the target application uses. S15001 to S15004 are added to FIG. 9 of the first example implementation.

First, the volume mapping table is searched by the volume ID of the volume being processed. At this time, if the volume ID is not guaranteed to be unique among storage systems, it is searched in combination with the storage ID having the volume.

As a result of the search, the storage driver determines whether the processing volume is shared among applications (S15002). This can be determined by finding multiple applications including the application requested to make takeover ready as a result of the search in S15001.

After that, the storage driver determines whether the volume has been copied (S15003). The storage driver can determine that the volume has been already copied by confirming whether there are entries that meet the following conditions except for the entry corresponding to the application specified by user at S9000.

(Condition 1) There are multiple volumes associated with the same volume claim corresponding to the volume.

(Condition 2) Of the volumes that satisfy condition 1, the owned storage exists at the destination site that the user has specified at S9000 as the destination site.

If there are entries that satisfy both conditions 1 and 2, the volume is considered to have already been copied. If not, the volume is considered not to have been copied yet.

If the volume has not been copied to the site specified as the destination site (S15003 is no), the storage driver proceeds to S9007 and establishes replication for the volume (S9007) and adds information on the destination volume to the volume mapping table (S9009).

If not (S15003 is yes), in this case, replication is not established, and information on the volume associated with the entry that is determined to satisfy the conditions at S15003 is added to the entry corresponding to the volume claim associated with the volume in process in the volume mapping table (S15004). This allows the application to be associated with the volume that has already been copied to make another application ready for take over. As a result, the copied volume can be identified as the volume used by this application at the time of takeover. This can avoid copying the volume to a new volume if the volume is shared at the source site and the volume has already been copied, thereby reducing unnecessary increase in storage capacity used.

Figure 15C:
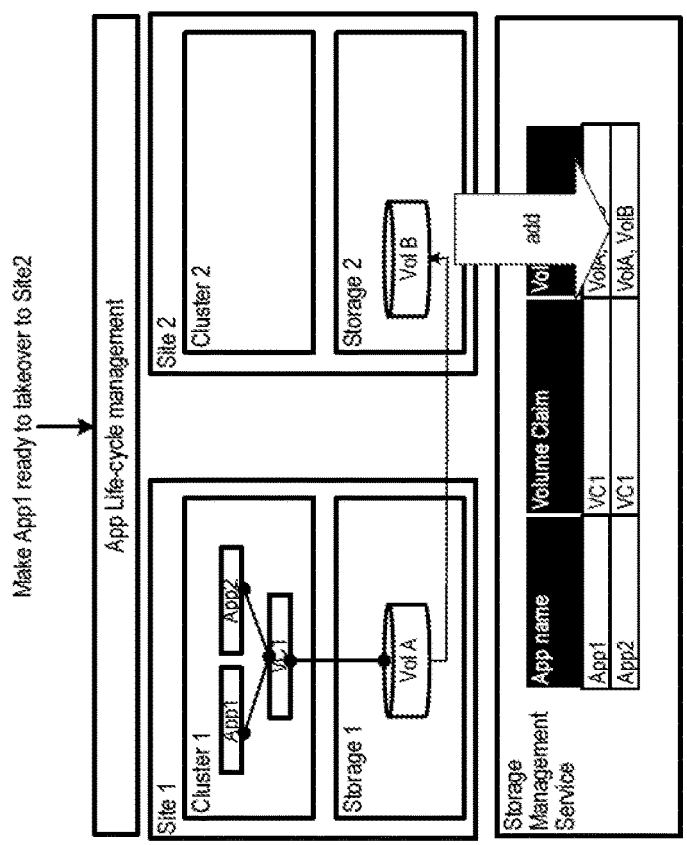
Figure 15B:
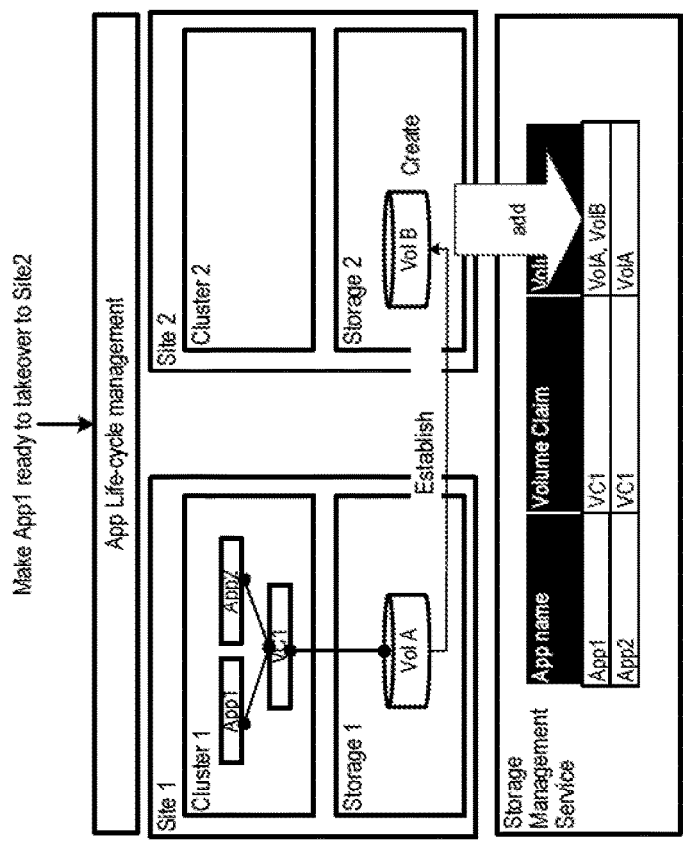

FIGS. 15(B) and 15(C) illustrates an example of when multiple applications share volumes, in accordance with the sixth example implementation. If multiple applications sharing the same volume are configured to be takeover ready to the same destination, the storage cost needs to be reduced compared to duplicating data individually with shared volumes at the destination. Specifically, FIG. 15(B) illustrates an example of processing the first application App1 for sharing volume VolB, and FIG. 15(C) illustrates processing of the second application App2 for sharing volume VolB. As illustrated in FIG. (C), if the volume shared at the source has already been copied to the destination (as in the case due to FIG. 15(B), a new copy is not established, and the existing destination volume is associated with the app in the volume mapping table.

Figure 16:
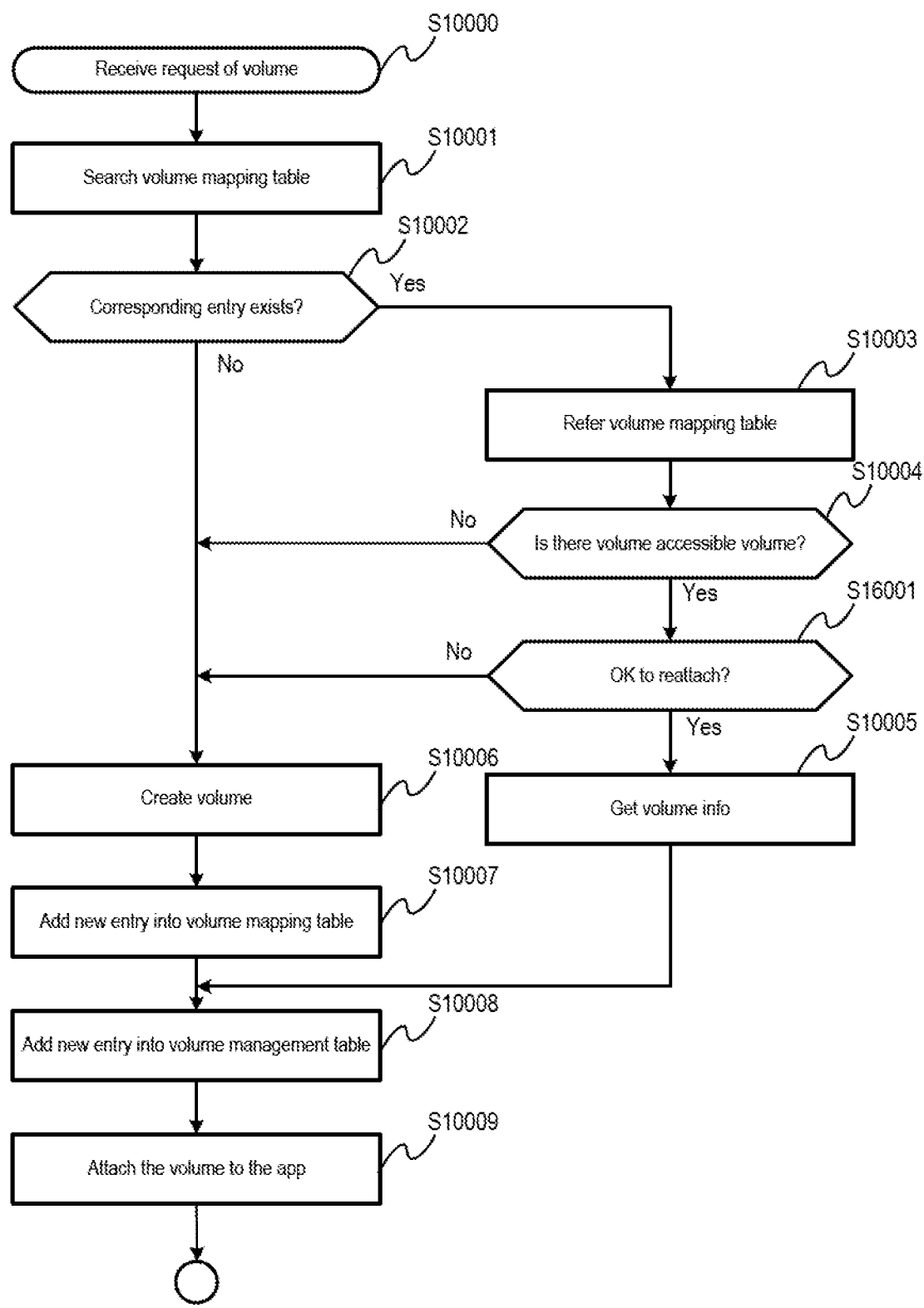
FIG. 16 illustrates an example of the processing flow to prepare volume for the application in the seventh example implementation.

FIG. 16 illustrates an example of the processing flow to prepare volume for the application in the seventh example implementation. The seventh example implementation discloses a volume preparation process flow that prevents volumes from being mistakenly attached to applications. The application name may be an arbitrary string named by the user and may happen to have the same name as a different application. In this case, volumes of another application are attached to the application, and the data stored in the volumes is unintentionally exposed to users who should not reference the data or the data may be corrupted by them.

In addition, users may intentionally desire to launch the application without previous data. For example, when the application is run once for testing and then tested again from the beginning, or when it is launched for production operation, then previous data may not necessarily be used. Another example is when an application is malfunctioning and needs to be initialized. In such cases, a new volume should be created and attached to the application, rather than reusing an existing volume.

FIG. 16 discloses how to create a new volume and then attach it, instead of attaching the existing volume to the application in these cases. Hereafter, only the differences from FIG. 10 are explained.

At S16001, the storage driver determines whether the volume identified by using the volume mapping table is OK to be attached to the application. An example of this method is to check whether the UID of the target application and the application UID of the entry identified in S10001 of the volume mapping table are identical. The UIDs may be different when different applications are deployed by different users with the same name, or when the same user deleted the application once and redeployed it again. Therefore, if the UIDs are different, the storage driver determines that the volumes are not OK to be attached, and if not, then the storage driver determines that the volume is OK to be attached.

Another example of a method is to specify whether or not to attach the existing volume as a parameter when the user deploys the application. In this method, if the user specifies not to use the existing volume, the storage driver determines that the volumes are not OK to be attached, and if not, the storage driver determines that the volume is OK to be attached.

If the storage driver determines that the volumes are not OK to be attached to the application (S16001 is no), the processing proceeds to S10006 and creates and attaches a new volume. If not (S16001 is yes), the processing proceeds to S10005.

Through the example implementations described herein, operational agility of application mobility can be improved by simplified operation. The user is not required to look up for the destination volume out of many volumes when an application is migrated onto the destination cluster.

In addition, the example implementations can improve resource utilization efficiency. When a takeover is initiated, it is possible to dynamically select a server or cluster with a large source surplus at the time and dynamically allocate resources for the application on them. As a result, unused reserved resources are eliminated, and the destination cluster or server can be flexibly determined based on resource usage. Such example implementations are therefore expected to improve resource utilization efficiency.

Figure 17:
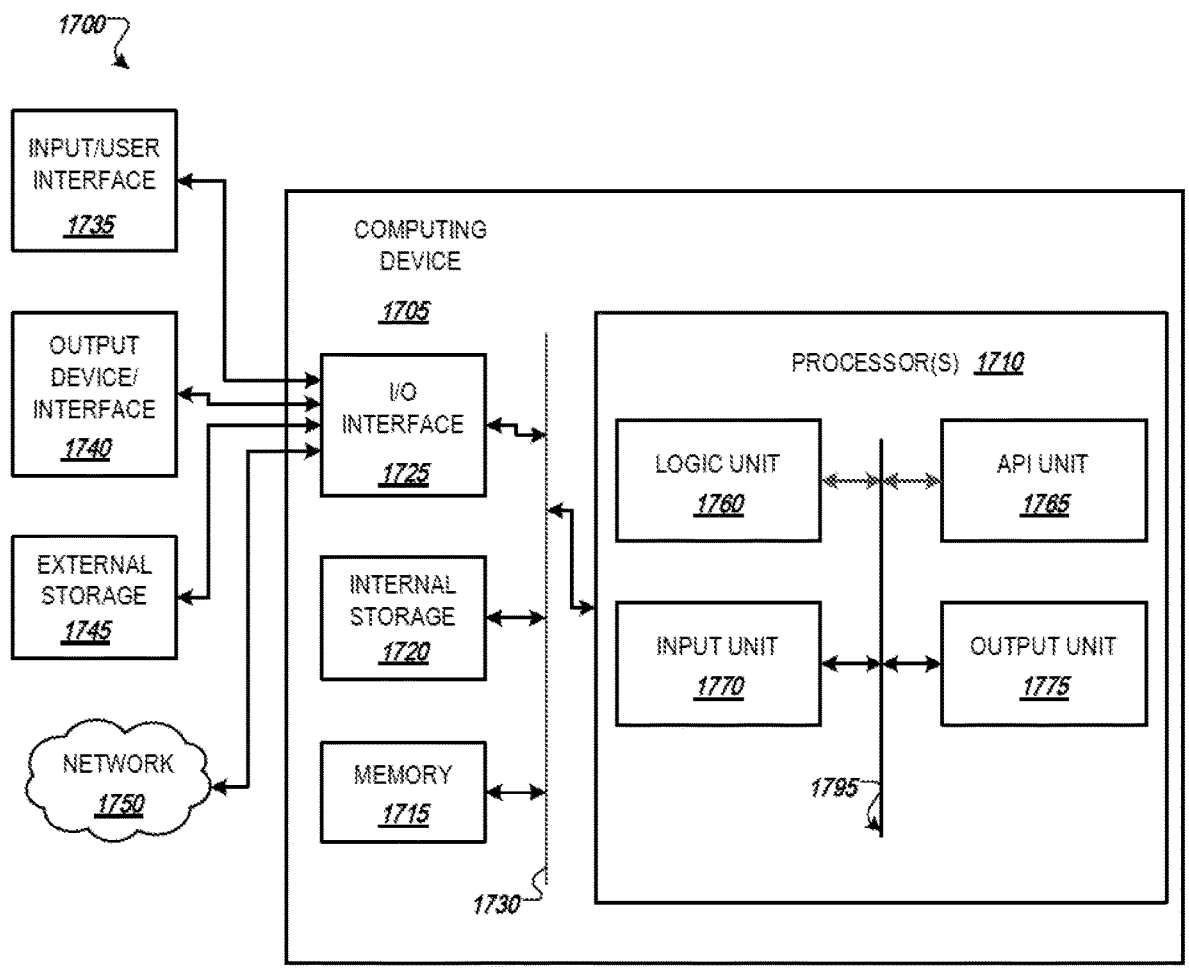
FIG. 17 illustrates an example computing environment with an example computer device suitable for use in some example implementations.

FIG. 17 illustrates an example computing environment with an example computer device suitable for use in some example implementations, such as storage management service as illustrated in FIG. 1(A) to 1(C), individual storage systems/devices, or storage containers as described herein to facilitate the desired implementation. Computer device 1705 in computing environment 1700 can include one or more processing units, cores, or processors 1710, memory 1715 (e.g., RAM, ROM, and/or the like), internal storage 1720 (e.g., magnetic, optical, solid state storage, and/or organic), and/or I/O interface 1725, any of which can be coupled on a communication mechanism or bus 1730 for communicating information or embedded in the computer device 1705. I/O interface 1725 is also configured to receive images from cameras or provide images to projectors or displays, depending on the desired implementation.

Computer device 1705 can be communicatively coupled to input/user interface 1735 and output device/interface 1740. Either one or both of input/user interface 1735 and output device/interface 1740 can be a wired or wireless interface and can be detachable. Input/user interface 1735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1740 may include a display, television, monitor, printer, speaker, braille, or the like. In some example implementations, input/user interface 1735 and output device/interface 1740 can be embedded with or physically coupled to the computer device 1705. In other example implementations, other computer devices may function as or provide the functions of input/user interface 1735 and output device/interface 1740 for a computer device 1705.

Examples of computer device 1705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1705 can be communicatively coupled (e.g., via I/O interface 1725) to external storage 1745 and network 1750 for communicating with any number of networked components, devices, and systems, including one or more computer devices of the same or different configuration. Computer device 1705 or any connected computer device can be functioning as, providing services of, or referred to as a server, client, thin server, general machine, special-purpose machine, or another label.

I/O interface 1725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1700. Network 1750 can be any network or combination of networks (e.g., the Internet, local area network, wide area network, a telephonic network, a cellular network, satellite network, and the like).

Computer device 1705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python. Perl, JavaScript, and others).

Processor(s) 1710 can execute under any operating system (OS) (not shown), in a native or virtual environment. One or more applications can be deployed that include logic unit 1760, application programming interface (API) unit 1765, input unit 1770, output unit 1775, and inter-unit communication mechanism 1795 for the different units to communicate with each other, with the OS, and with other applications (not shown). The described units and elements can be varied in design, function, configuration, or implementation and are not limited to the descriptions provided. Processor(s) 1710 can be in the form of hardware processors such as central processing units (CPUs) or in a combination of hardware and software units.

In some example implementations, when information or an execution instruction is received by API unit 1765, it may be communicated to one or more other units (e.g., logic unit 1760, input unit 1770, output unit 1775). In some instances, logic unit 1760 may be configured to control the information flow among the units and direct the services provided by API unit 1765, input unit 1770, output unit 1775, in some example implementations described above. For example, the flow of one or more processes or implementations may be controlled by logic unit 1760 alone or in conjunction with API unit 1765. The input unit 1770 may be configured to obtain input for the calculations described in the example implementations, and the output unit 1775 may be configured to provide output based on the calculations described in example implementations.

Processor(s) 1710 can be configured to execute a method or instructions that can involve managing volume management information indicative of a relationship between an application and a volume used by the application as illustrated in FIG. 1(A) to 1(C); for receipt of a first request to make the application ready for takeover to another location, updating the volume management information to indicate that another volume of the another location is associated with the application; for receipt of a second request to conduct volume attachment for the application, identifying one or more volumes associated with the application based on the volume management information; and attaching an identified volume from the identified one or more volumes to the application as illustrated in FIGS. 1(A) to 1(C) and FIG. 10.

Processor(s) 1710 can be configured to execute any of the method or instructions as described above, and further involve for the receipt of the first request to make the application ready for takeover to the another location, creating the another volume for the volume used by the application as illustrated in FIG. 10.

Processor(s) 1710 can be configured to execute any of the method or instructions as described above, and further involve for the receipt of the first request to make the application ready for takeover to the another location, establishing a copy relation between the volume used by the application and the another volume as illustrated in FIG. 1(A) to 1(C).

Depending on the desired implementation, the volume management information can be managed by a centralized storage management service as illustrated in FIG. 1(A) to 1(C).

Processor(s) 1710 can be configured to execute any of the method or instructions as described above, and further involve for the identified one or more volumes being more than one volume, selecting the identified volume from the identified one or more volumes that is accessible by a cluster from which the application is launched as illustrated in FIG. 1(C). For example, the selecting the identified volume can be conducted as selecting the identified volume from the identified one or more volumes that is located in a same location as the cluster from which the application is launched.

Depending on the desired implementation, the volume management information can be distributively managed by a first storage system associated with the volume and a second storage system associated with the another location as illustrated in FIG. 11(A) to 11(C).

Depending on the desired implementation, the volume management information can be indicative of a relationship between volume claim of the application and the volume used by the application as illustrated in FIG. 12(A) to 12(C).

Processor(s) 1710 can be configured to execute any of the method or instructions as described above, and further involve, for receipt of a third request to clone the application, establishing a data copy relationship with a destination volume for the volume used by the application; and relating the destination volume to a clone of the application in the volume management information as illustrated in FIGS. 13(A) and 13(B).

Processor(s) 1710 can be configured to execute any of the method or instructions as described above, and further involve, for receipt of a fourth request to disable takeover ready status for the application, identifying a destination volume having a data copy relationship with the volume from the volume management information; disabling the data copy relationship between the destination volume and the volume; and updating the volume management information to remove an association with the destination volume and the application as illustrated in FIGS. 14(A) and 14(B).

Processor(s) 1710 can be configured to execute any of the method or instructions as described above, and further involve, for the receipt of the first request to make the application ready for takeover to the another location, identifying one or more other applications that also use the volume used by the application; and updating the volume management information to indicate that the another volume is associated with the identified one or more other applications as illustrated in FIG. 15(A) to 15(C).

Processor(s) 1710 can be configured to execute any of the method or instructions as described above, and further involve, for the receipt of a second request to conduct the volume attachment for the application, determining whether the application for the volume attachment indicated in the second request has a same universal unique identifier (UUID) as the application managed in the volume management information; for the determination that the application for the volume attachment indicated in the second request does not have the same UUID, creating a new volume for the application for the volume attachment indicated in the second request instead of attaching the identified volume from the identified one or more volumes to the application so as to prevent misattachment based on UID as described with respect to FIG. 16.

Processor(s) 1710 can be configured to execute any of the method or instructions as described above, and further involve, for the receipt of a second request to conduct the volume attachment for the application, for a parameter the application indicated in the second request indicative of disabling use of existing volumes, creating a new volume for the application for the volume attachment indicated in the second request instead of attaching the identified volume from the identified one or more volumes to the application to prevent misattachment based on parameter as described with respect to FIG. 16.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software.

Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   managing volume management information indicative of a relationship between an application and a volume used by the application;
   for receipt of a first request to make the application ready for takeover to another location, updating the volume management information to indicate that another volume of the another location is associated with the application;
   for receipt of a second request to conduct volume attachment for the application:
      identifying one or more volumes associated with the application based on the volume management information;
      attaching an identified volume from the identified one or more volumes to the application; and
      for a parameter the application indicated in the second request indicative of disabling use of existing volumes, creating a new volume for the application for the volume attachment indicated in the second request instead of attaching the identified volume from the identified one or more volumes to the application.

2. The method of claim 1, further comprising, for the receipt of the first request to make the application ready for takeover to the another location, creating the another volume for the volume used by the application.

3. The method of claim 1, further comprising, for the receipt of the first request to make the application ready for takeover to the another location, establishing a copy relation between the volume used by the application and the another volume.

4. The method of claim 1, wherein the volume management information is managed by a centralized storage management service.

5. The method of claim 1, further comprising, for the identified one or more volumes being more than one volume, selecting an identified volume from the identified one or more volumes that is accessible by a cluster from which the application is launched.

6. The method of claim 5, wherein the selecting the identified volume is conducted as selecting the identified volume from the identified one or more volumes that is located in a same location as the cluster from which the application is launched.

7. The method of claim 1, wherein the volume management information is distributively managed by a first storage system associated with the volume and a second storage system associated with the another location.

8. The method of claim 1, wherein the volume management information is indicative of a relationship between volume claim of the application and the volume used by the application.

9. The method of claim 1, further comprising, for receipt of a third request to clone the application:
   establishing a data copy relationship with a destination volume for the volume used by the application; and
   relating the destination volume to a clone of the application in the volume management information.

10. The method of claim 1, further comprising, for receipt of a fourth request to disable takeover ready status for the application:
    identifying a destination volume having a data copy relationship with the volume from the volume management information;
    disabling the data copy relationship between the destination volume and the volume; and
    updating the volume management information to remove an association with the destination volume and the application.

11. The method of claim 1, further comprising, for the receipt of the first request to make the application ready for takeover to the another location:
    identifying one or more other applications that also use the volume used by the application; and
    updating the volume management information to indicate that the another volume is associated with the identified one or more other applications.

12. The method of claim 1, further comprising, for the receipt of a second request to conduct the volume attachment for the application:
    determining whether the application for the volume attachment indicated in the second request has a same universal unique identifier (UUID) as the application managed in the volume management information;
    for the determination that the application for the volume attachment indicated in the second request does not have the same UUID, creating a new volume for the application for the volume attachment indicated in the second request instead of attaching the identified volume from the identified one or more volumes to the application.

13. A non-transitory computer readable medium, storing instructions for executing a process, the instructions comprising:
    managing volume management information indicative of a relationship between an application and a volume used by the application;
    for receipt of a first request to make the application ready for takeover to another location, updating the volume management information to indicate that another volume of the another location is associated with the application;
    for receipt of a second request to conduct volume attachment for the application:
       identifying one or more volumes associated with the application based on the volume management information;
       attaching an identified volume from the identified one or more volumes to the application; and
       for a parameter the application indicated in the second request indicative of disabling use of existing volumes, creating a new volume for the application for the volume attachment indicated in the second request instead of attaching the identified volume from the identified one or more volumes to the application.

14. An apparatus, comprising:
a processor, configured to:
manage volume management information indicative of a relationship between an application and a volume used by the application;
for receipt of a first request to make the application ready for takeover to another location, update the volume management information to indicate that another volume of the another location is associated with the application;
for receipt of a second request to conduct volume attachment for the application:
  identify one or more volumes associated with the application based on the volume management information;
  attach an identified volume from the identified one or more volumes to the application; and
  for a parameter the application indicated in the second request indicative of disabling use of existing volumes, create a new volume for the application for the volume attachment indicated in the second request instead of attaching the identified volume from the identified one or more volumes to the application.

* * * * *